Figure 1:
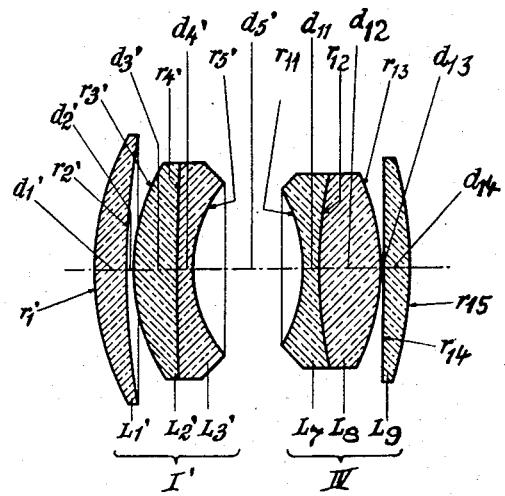

June 18, 1957  G. KLEMT  2,796,002
REPLACEABLE FRONT LENS ASSEMBLY FOR A GAUSSIAN
DUAL OPTICAL OBJECTIVE SYSTEM
Filed June 21, 1954

INVENTOR.
Günter Klemt.
BY
Karl F. Ross
AGENT

United States Patent Office 2,796,002
Patented June 18, 1957

2,796,002

REPLACEABLE FRONT LENS ASSEMBLY FOR A GAUSSIAN DUAL OPTICAL OBJECTIVE SYSTEM

Günter Klemt, Kreuznach, Rhineland, Germany, assignor to Jos. Schneider & Co., Kreuznach, Rhineland, Germany Application June 21, 1954, Serial No. 438,174

Claims priority, application Germany June 26, 1953

7 Claims. (Cl. 88—57)

It has already been proposed to bring about changes in the focal length of a photographic objective (and, thereby, in the scale of the projected image), without substantially varying its effective image distance, by interchanging a detachable objective portion on the object side co-operating with a fixed objective portion on the image side.

The practical realization of this idea has heretofore run into obstacles of both a purely optical and an optico-mechanical nature. The last-mentioned obstacles arise from the difficulty of properly positioning the detachable front portion of an exchange objective with respect to the fixed rear portion common to both the exchange and the principal or normal-view objective; means for overcoming this difficulty have been disclosed in co-pending applications Ser. No. 402,679, filed January 7, 1954, by myself, and Ser. No. 431,506, filed May 21, 1954, by Paul Härter et al., both owned by the assignee of the present application.

The other class of obstacles arise from the difficulty of so calculating the components of both the fixed rear objective portion and the two or more detachable objective portions that the combination of this rear portion with either or each of the associated front portions will result in sharp image definition and satisfactory suppression of residual aberrations. The general object of my present invention is the elimination of this latter difficulty with particular reference to exchange objectives whose focal length is less than that of the principal or normal-view objective, thus to exchange objective of the wide-angle type. A more specific object of this invention is to provide an improved exchange objective of the aforementioned character whose fixed rear portion is one of the halves of a Gaussian dual objective and whose detachable front portion is adapted to replace the other half of such dual objective, the usual diaphragm space being enclosed between these two portions.

A feature of this invention resides in the provision of an objective portion adapted to replace the front half of a Gaussian dual objective of a type which comprises a pair of collective outer lenses between which there are enclosed a pair of dispersive meniscus-shaped lens components facing the diaphragm space and composed each of a positive and a negative lens cemented together, this objective portion including the following three lens members: (a) a rear lens member similar to the front half of the principal Gaussian objective and comprising a negative meniscus-shaped lens component with its concave side facing the diaphragm space and, preceding this lens component, a positive lens; (b) a front member comprising a negative meniscus-shaped lens component with its concave side facing in the direction of the shorter light rays, i. e. toward the diaphragm space; and (c) an intermediate positive lens member constituting with the last-mentioned lens component an inverted Galilean telescope, the air space between the two lens members (b) and (c) of this telescope being large compared with the other air spaces of the entire objective portion referred to.

A more specific feature of this invention resides in constructing each of the first two lens members, (b) and (c), of the objective portion as a compound lens across whose cemented surfaces there occurs (proceeding from the object side to the image side) a marked decrease in the refractive index $n_d$ coupled, at least for the second lens member, with a marked increase in the Abbé number $\nu_d$. The decrease in the refractive index should be of the order of or greater than 0.09 for the first and of the order of or greater than 0.15 for the second of these members, the increase in the Abbé number of the second member being at the same time of the order of or greater than 25. More particularly, I have found that the refractive index of the second lens member should decrease by more than 0.30 when the decrease in the first lens member is less than 0.10, and that the refractive index of the second lens member should decrease by less than 0.30 when the decrease in the first lens member exceeds 0.10; preferably, the increase in the Abbé number of the second lens member is at least 35 in the first instance and not greater than 30 in the second instance.

Figure 2:
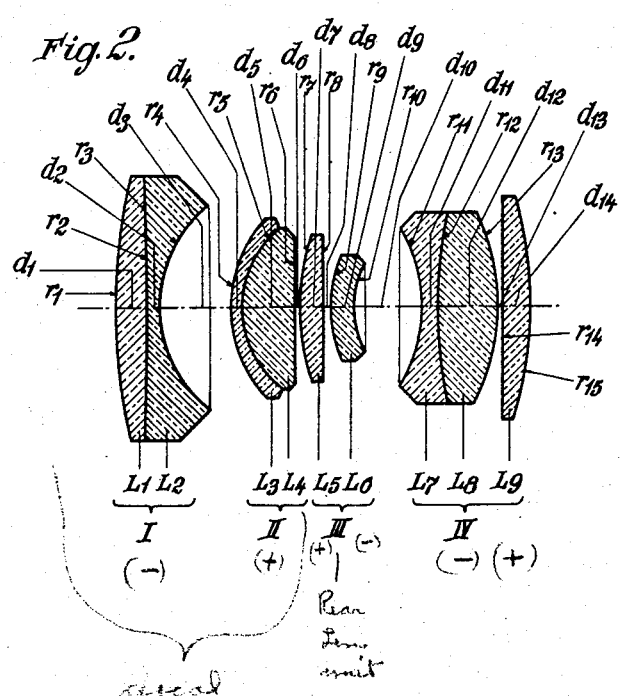

The invention will be further described with reference to the accompanying drawing in which:

Fig. 1 schematically illustrates the front and rear halves of a fundamental optical system, of predetermined focal length, in the form of a Gaussian dual objective; and Fig. 2 illustrates an exchange objective, of reduced focal length, obtained by substituting a group of lens members according to the invention for the front half of the objective of Fig. 1.

The Gaussian objective of Fig. 1 comprises a front half I' detachably secured to a rear half IV by means not shown (e. g. in the manner disclosed in either of the aforementioned co-pending applications). Front half I' consists of a positive, slightly meniscus-shaped lens member $L_1'$, whose radii are $r_1'$, $r_2'$ and whose thickness is $d_1'$, followed by a compound negative meniscus lens member composed of lenses $L_2'$ (radii $r_3'$, $r_4'$ and thickness $d_3'$) and $L_3'$ (radii $r_4'$, $r_5'$ and thickness $d_4'$), the spacing between the two lens members being designated $d_2'$. Rear half IV consists of a compound negative meniscus lens member composed of lenses $L_7$ (radii $r_{11}$, $r_{12}$ and thickness $d_{11}$) and $L_8$ (radii $r_{12}$, $r_{13}$ and thickness $d_{12}$) followed by a positive lens member $L_9$ (radii $r_{13}$, $r_{14}$ and thickness $d_{14}$), the spacing between the two last-mentioned members being designated $d_{13}$. The relatively large distance $d_5'$ between objective portions I' and IV defines a diaphragm space adapted to receive the usual iris diaphragm and shutter (not shown).

With an aperture ratio of 1:2, an overall focal length given the numerical value of 100 and an image distance (the spacing between the last lens $L_9$ and the surface of projection) equal to 72.4, the radii, thicknesses and spacings of the lens elements of the system of Fig. 1 may be as follows:

Table A

| | | | | $n_d$ | $\nu_d$ |
|---|---|---|---|---|---|
| I' | $L_1'$ | $r_1'=+\ 54.83$ | $d_1'=\ 6.71$ | 1.67003 | 47.2 |
| | | $r_2'=+156.25$ | $d_2'=\ 1.27$ | (Air Space) | |
| | $L_2'$ | $r_3'=+\ 39.67$ | $d_3'=\ 8.93$ | 1.69347 | 53.5 |
| | $L_3'$ | $r_4'=+168.32$ | $d_4'=\ 3.52$ | 1.66446 | 35.9 |
| | | $r_5'=+\ 25.89$ | $d_5'=21.21$ | (Diaphragm Space) | |
| IV | $L_7$ | $r_{11}=-\ 30.20$ | $d_{11}=\ 3.17$ | 1.63980 | 34.6 |
| | $L_8$ | $r_{12}=+\ 90.18$ | $d_{12}=11.88$ | 1.65844 | 50.8 |
| | | $r_{13}=-\ 41.87$ | $d_{13}=\ 0.21$ | (Air Space) | |
| | $L_9$ | $r_{14}=+2359.37$ | $d_{14}=\ 5.25$ | 1.74472 | 44.7 |
| | | $r_{15}=-\ 77.24$ | | | |

In the exchange objective of Fig. 2 the lens group I' of Fig. 1 has been replaced by an assembly including three lens units I, II and III. Forward lens unit I is a negative meniscus composed of cemented lenses $L_1$ (radii $r_1$, $r_2$ and thickness $d_1$) and $L_2$ (radii $r_2$, $r_3$ and thickness $d_2$); intermediate lens unit II is a slightly meniscus-shaped positive lens member composed of cemented lenses $L_3$ (radii $r_4$, $r_5$ and thickness $d_4$) and $L_4$ (radii $r_5$, $r_6$ and thickness $d_5$), its spacing from lens unit I being designated $d_3$; and rear lens unit III comprises two air-spaced lens members, including a positive lens $L_5$ (radii $r_7$, $r_8$ and thickness $d_7$) and a negative meniscus $L_6$ (radii $r_9$, $r_{10}$ and thickness $d_9$), the air space between these lens members being designated $d_8$ and the spacing of lens $L_5$ from lens unit II being designated $d_6$. The length of the diaphragm space between lens $L_6$ of lens unit III and lens $L_7$ of the fixed lens group IV is designated $d_{10}$.

The lenses $L_5$ and $L_6$ of lens unit III are generally similar to those constituting the lens group I' in Fig. 1. Units I and II of Fig. 2 together constitute an inverse Galilean telescope whose air space $d_3$ may be variable and is large compared with the remaining air spaces $d_6$ and $d_8$ of the exchange assembly, being for instance roughly equal to or greater than the diaphragm space $d_{10}$.

In the following Table B I have given illustrative values for the radii, thicknesses and air spaces of the exchange portion of an optical system as shown in Fig. 2, having an aperture ratio of 1:4.5, a focal length of 73.6 and an image distance of 72.0; the parameters of unit IV are the same as in Table A:

Table B

| | | | | $n_d$ | $\nu_d$ |
|---|---|---|---|---|---|
| I | $L_1$ | $r_1=+115.67$ | $d_1=\ 6.75$ | 1.71736 | 29.5 |
| | $L_2$ | $r_2=-227.45$ | $d_2=\ 2.11$ | 1.62041 | 60.3 |
| | | $r_3=+\ 25.22$ | $d_3=14.24$ | (Air Space) | |
| II | $L_3$ | $r_4=+\ 25.75$ | $d_4=\ 2.11$ | 1.80518 | 25.5 |
| | $L_4$ | $r_5=+\ 20.21$ | $d_5=10.55$ | 1.46450 | 65.7 |
| | | $r_6=+784.00$ | $d_6=\ 1.27$ | (Air Space) | |
| III | $L_5$ | $r_7=+\ 46.36$ | $d_7=\ 4.85$ | 1.58900 | 48.6 |
| | | $r_8=-589.63$ | $d_8=\ 1.69$ | (Air Space) | |
| | $L_6$ | $r_9=+\ 26.25$ | $d_9=\ 4.85$ | 1.72825 | 28.3 |
| | | $r_{10}=+\ 17.74$ | $d_{10}=13.72$ | (Diaphragm Space) | |

In the foregoing example, it will be noted, the refractive index of lens $L_1$ of compound lens unit I exceeds that of lens $L_2$, to which it is cemented, by a value lying between 0.09 and 0.10; the refractive index of lens $L_3$ of compound lens unit II exceeds that of its companion lens $L_4$ by more than 0.30, the Abbé number of the latter at the same time exceeding that of the former by more than 35.

In a modification, the optical system of Fig. 2 may have an aperture ratio of 1:4.5, a focal length of 73.7 and an image distance of 72.0 with radii, thicknesses and air spaces as given in the following Table C, the parameters of unit IV being again the same as in Table A:

Table C

| | | | | $n_d$ | $\nu_d$ |
|---|---|---|---|---|---|
| I | $L_1$ | $r_1=+120.40$ | $d_1=\ 6.85$ | 1.57270 | 32.2 |
| | $L_2$ | $r_2=-258.91$ | $d_2=\ 2.11$ | 1.51821 | 65.2 |
| | | $r_3=+\ 28.30$ | $d_3=20.19$ | (Air Space) | |
| II | $L_3$ | $r_4=+\ 29.12$ | $d_4=\ 2.11$ | 1.67270 | 32.2 |
| | $L_4$ | $r_5=+\ 20.05$ | $d_5=\ 6.11$ | 1.51112 | 60.6 |
| | | $r_6=+\ 88.37$ | $d_6=\ 1.79$ | (Air Space) | |
| III | $L_5$ | $r_7=+\ 38.90$ | $d_7=\ 4.85$ | 1.60311 | 60.7 |
| | | $r_8=+413.30$ | $d_8=\ 3.37$ | (Air Space) | |
| | $L_6$ | $r_9=+\ 29.12$ | $d_9=\ 2.95$ | 1.62536 | 35.6 |
| | | $r_{10}=+\ 19.07$ | $d_{10}=13.70$ | (Diaphragm Space) | |

In this instance the refractive index of lens $L_1$ exceeds that of lens $L_2$ by a value greater than 0.10, the refractive index of lens $L_3$ exceeds that of lens $L_4$ by a value lying between 0.15 and 0.30, and the Abbé number of lens $L_4$ exceeds that of lens $L_3$ by a value lying between 25 and 30.

It may be mentioned that in both Table B and Table C the difference in the Abbé numbers of the first compound lens member $L_1$, $L_2$ is of roughly the same order as that of the second compound lens member $L_3$, $L_4$.

I claim:

1. A front lens assembly adapted to replace the front half of a Gaussian dual objective whose front and rear halves define between them a diaphragm space, each of said halves comprising a dispersive meniscus lens component adjacent said diaphragm space and facing same with its concave side as well as a positive lens beyond said meniscus lens component; said front lens assembly comprising a rear lens unit including a negative meniscus lens component facing said diaphragm space with its concave side and a positive lens preceding said negative meniscus lens component, an intermediate lens unit including a positive lens member, and a front lens unit including a meniscus-shaped negative lens member facing said diaphragm space with its concave side, said front and intermediate lens units together defining an afocal system in the shape of an inverse Galilean telescope and being separated from each other by an air space which is large compared with all other air spaces of said lens assembly, said rear unit being so dimensioned as to shorten the focal length of said objective without substantial change in image distance upon being substituted for said front half.

2. A lens assembly according to claim 1, wherein said meniscus-shaped member of said front lens and is compounded of a first pair of front and rear lens elements and said positive lens member of said intermediate lens unit is compounded of a second pair of front and rear lens elements, the front element of said first pair having a refractive index exceeding that of the rear element of said first pair by a value at least of the order of 0.09, the front element of said second pair having a refractive index exceeding that of the rear element of said second pair by a value at least of the order of 0.15, the rear element of said second pair having an Abbé number exceeding that of the front element of said second pair by a value at least of the order of 25.

3. In an optical system, in combination, a front lens assembly and a rear lens assembly detachable from each other and defining between them a diaphragm space, said rear lens assembly comprising a dispersive meniscus lens component adjacent said diaphragm space and facing same with its concave side as well as a positive lens back of said meniscus lens component, said front lens assembly comprising a front lens unit, an intermediate lens unit and a rear lens unit; said rear unit including a negative meniscus lens component facing said diaphragm space with its concave side and a positive lens preceding said negative meniscus lens component; said intermediate unit including a positive lens member; said front unit including a meniscus-shaped negative lens member facing said diaphragm space with its concave sides; said front and intermediate units together defining an afocal system in the shape of an inverse Galilean telescope and being separated from each other by an air space which is large compared with all other air spaces of said system except said diaphragm space.

4. The combination according to claim 3, wherein said air space between said front and intermediatie units is at least of the same order of magnitude as said diaphragm space.

5. The combination according to claim 3, wherein said air space between said front and intermediate units is variable.

6. The combination according to claim 3, wherein said rear assembly is adapted to cooperate with a roughly mirror-symmetrical lens assembly to form a Gaussian dual objective of predetermined focal length and image distance, said front and rear assemblies together having an image distance substantially equal to and an overall focal length considerably shorter than that of said Gaussian dual objective, said meniscus-shaped member of said front unit being compounded of a first pair of front and rear lens elements and said positive lens member of said intermediate unit being compounded of a second pair of front and rear lens elements; the radii $r_1$, $r_2$ and thickness $d_1$ of the front element $L_1$ of said first pair, the radii $r_2$, $r_3$ and thickness $d_2$ of the rear element $L_2$ of said first pair, the air space $d_3$ between said front and intermediate units, the radii $r_4$, $r_5$ and thickness $d_4$ of the front element $L_3$ of said second pair, the radii $r_5$ $r_6$ and thickness $d_5$ of the rear element $L_4$ of said second pair, the air space $d_6$ between said intermediate and rear units, the radii $r_7$, $r_8$ and thickness $d_7$ of the positive lens $L_5$ of said rear unit, the air space $d_8$ between said positive lens and said negative meniscus lens component of said rear unit, the radii $r_9$, $r_{10}$ and thickness $d_9$ of said negative meniscus lens component $L_6$ of said rear unit, the diaphragm space $d_{10}$, the radii $r_{11}$, $r_{12}$ and thickness $d_{11}$ of a front element $L_7$ of said dispersive meniscus lens component of said rear assembly, the radii $r_{12}$, $r_{13}$ and thickness $d_{12}$ of a rear element $L_8$ of the last-mentioned meniscus lens component, the air space $d_{13}$ between said last-mentioned meniscus lens component and said positive lens $L_9$ of said rear assembly, the radii $r_{14}$, $r_{15}$ and thickness $d_{14}$ of said positive lens $L_9$ of said rear assembly, the refractive indices $n_d$ of all the components $L_1$ . . . $L_9$ of said front and rear assemblies, and the Abbé numbers $\nu_d$ of all of said components being substantially as given in the following table, said front and rear assemblies together defining an exchange objective having an overall focal length of substantially 73.6 and an image distance of substantially 72.0, all based upon a numerical value of 100 for the overall focal length of said Gaussian dual objective:

|  |  |  | $n_d$ | $\nu_d$ |
|---|---|---|---|---|
| $L_1$ | $r_1 = +\ 115.67$ | $d_1 = 6.75$ | 1.71736 | 29.5 |
|  | $r_2 = -\ 227.45$ | $d_2 = 2.11$ | 1.62041 | 60.3 |
| $L_2$ | $r_3 = +\ 25.22$ | $d_3 = 14.24$ | (Air Space) |  |
|  | $r_4 = +\ 25.75$ | $d_4 = 2.11$ | 1.80518 | 25.5 |
| $L_3$ | $r_5 = +\ 20.21$ | $d_5 = 10.55$ | 1.46450 | 65.7 |
| $L_4$ | $r_6 = +\ 784.00$ | $d_6 = 1.27$ | (Air Space) |  |
|  | $r_7 = +\ 46.36$ | $d_7 = 4.85$ | 1.58900 | 48.6 |
| $L_5$ | $r_8 = -\ 589.63$ | $d_8 = 1.69$ | (Air Space) |  |
|  | $r_9 = +\ 26.25$ | $d_9 = 4.85$ | 1.72825 | 28.3 |
| $L_6$ | $r_{10} = +\ 17.74$ | $d_{10} = 13.72$ | (Diaphragm Space) |  |
|  | $r_{11} = -\ 30.20$ | $d_{11} = 3.17$ | 1.63980 | 34.6 |
| $L_7$ | $r_{12} = +\ 90.18$ | $d_{12} = 11.88$ | 1.65844 | 50.8 |
| $L_8$ | $r_{13} = -\ 41.87$ | $d_{13} = 0.21$ | (Air Space) |  |
|  | $r_{14} = +2359.37$ | $d_{14} = 5.25$ | 1.74472 | 44.7 |
| $L_9$ | $r_{15} = -\ 77.24$ |  |  |  |

7. The combination according to claim 3, wherein said rear assembly is adapted to cooperate with a roughly mirror-symmetrical lens assembly to form a Gaussian dual objective of predetermined focal length and image distance, said front and rear assemblies together having an image distance substantially equal to and an overall focal length considerably shorter than that of said Gaussian dual objective, said meniscus-shaped member of said front unit being compounded of a first pair of front and rear lens elements and said positive lens member of said intermediate unit being compounded of a second pair of front and rear lens elements; the radii $r_1$, $r_2$ and thickness $d_1$ of the front element $L_1$ of said first pair, the radii $r_2$, $r_3$ and thickness $d_2$ of the rear element $L_2$ of said first pair, the air space $d_3$ between said front and intermediate units, the radii $r_4$, $r_5$ and thickness $d_4$ of the front element $L_3$ of said second pair, the radii $r_5$, $r_6$ and thickness $d_5$ of the rear element $L_4$ of said second pair, the air space $d_6$ between said intermediate and rear units, the radii $r_7$, $r_8$ and thickness $d_7$ of the positive lens $L_5$ of said rear units, the air space $d_8$ between said positive lens and said negative meniscus lens component of said rear unit, the radii $r_9$, $r_{10}$ and thickness $d_9$ of said negative meniscus lens component $L_6$ of said rear unit, the diaphragm space $d_{10}$, the radii $r_{11}$, $r_{12}$ and thickness $d_{11}$ of a front element $L_7$ of said dispersive meniscus lens component of said rear assembly, the radii $r_{12}$, $r_{13}$ and thickness $d_{12}$ of a rear element $L_8$ of the last-mentioned meniscus lens component, the air space $d_{13}$ between said last-mentioned meniscus lens component and said positive lens $L_9$ of said rear assembly, the radii $r_{14}$, $r_{15}$ and thickness $d_{14}$ of said positive lens $L_9$ of said rear assembly, the refractive indices $n_d$ of all the components $L_1$ . . . $L_9$ of said front and rear assemblies, and the Abbé numbers $\nu_d$ of all of said components being substantially as given in the following table, said front and rear assemblies together defining an exchange objective having an overall focal length of substantially 73.7 and an image distance of substantially 72.0, all based upon a numerical value of 100 for the overall focal length of said Gaussian dual objective:

| | | | $n_d$ | $\nu_d$ |
|---|---|---|---|---|
| $L_1$ | $r_1 = +\ 120.40$ | $d_1 = 6.85$ | 1.67270 | 32.2 |
| $L_2$ | $r_2 = -\ 258.91$ | $d_2 = 2.11$ | 1.51821 | 65.2 |
| | $r_3 = +\ 28.30$ | $d_3 = 20.19$ | (Air Space) | |
| $L_3$ | $r_4 = +\ 29.12$ | $d_4 = 2.11$ | 1.67270 | 32.2 |
| $L_4$ | $r_5 = +\ 20.05$ | $d_5 = 6.11$ | 1.51112 | 60.6 |
| | $r_6 = +\ 88.37$ | $d_6 = 1.79$ | (Air Space) | |
| $L_5$ | $r_7 = +\ 38.90$ | $d_7 = 4.85$ | 1.60311 | 60.7 |
| | $r_8 = +\ 413.30$ | $d_8 = 3.37$ | (Air Space) | |
| $L_6$ | $r_9 = +\ 29.12$ | $d_9 = 2.95$ | 1.62536 | 35.6 |
| | $r_{10} = +\ 19.07$ | $d_{10} = 13.70$ | (Diaphragm Space) | |
| $L_7$ | $r_{11} = -\ 30.20$ | $d_{11} = 3.17$ | 1.63980 | 34.6 |
| $L_8$ | $r_{12} = +\ 90.18$ | $d_{12} = 11.88$ | 1.65844 | 50.8 |
| | $r_{13} = -\ 41.87$ | $d_{13} = 0.21$ | (Air Space) | |
| $L_9$ | $r_{14} = +2359.37$ | $d_{14} = 5.25$ | 1.74472 | 44.7 |
| | $r_{15} = -\ 77.24$ | | | |

References Cited in the file of this patent

UNITED STATES PATENTS

| | | |
|---|---|---|
| 461,609 | Gundlach | Oct. 20, 1891 |
| 583,336 | Rudolph | May 25, 1897 |
| 660,202 | Rudolph | Oct. 23, 1900 |
| 1,934,561 | Rayton | Nov. 7, 1933 |
| 2,117,252 | Lee | May 10, 1938 |
| 2,184,018 | Ort | Dec. 19, 1939 |
| 2,263,024 | Wood | Nov. 18, 1941 |
| 2,317,790 | Mellor | Apr. 27, 1943 |
| 2,324,057 | Bennett | July 13, 1943 |
| 2,582,085 | Tolle | Jan. 8, 1952 |
| 2,612,077 | Albrecht | Sept. 30, 1952 |

FOREIGN PATENTS

| | | |
|---|---|---|
| 730,867 | France | May 23, 1932 |